Oct. 17, 1933.  B. F. DAVIS  1,931,433
BOTTLE CAPPING APPARATUS
Filed May 28, 1930     5 Sheets-Sheet 1

Oct. 17, 1933.  B. F. DAVIS  1,931,433
BOTTLE CAPPING APPARATUS
Filed May 28, 1930   5 Sheets-Sheet 2

Inventor
Benjamin F. Davis
By his Attorneys
Merchant and Gregor

Oct. 17, 1933.                B. F. DAVIS                 1,931,433
                        BOTTLE CAPPING APPARATUS
                        Filed May 28, 1930        5 Sheets-Sheet 3

Inventor
Benjamin F. Davis
By his Attorneys

Oct. 17, 1933.  B. F. DAVIS  1,931,433
BOTTLE CAPPING APPARATUS
Filed May 28, 1930   5 Sheets-Sheet 4

Inventor
Benjamin F. Davis
By his Attorneys

Oct. 17, 1933.   B. F. DAVIS   1,931,433
BOTTLE CAPPING APPARATUS
Filed May 28, 1930   5 Sheets-Sheet 5
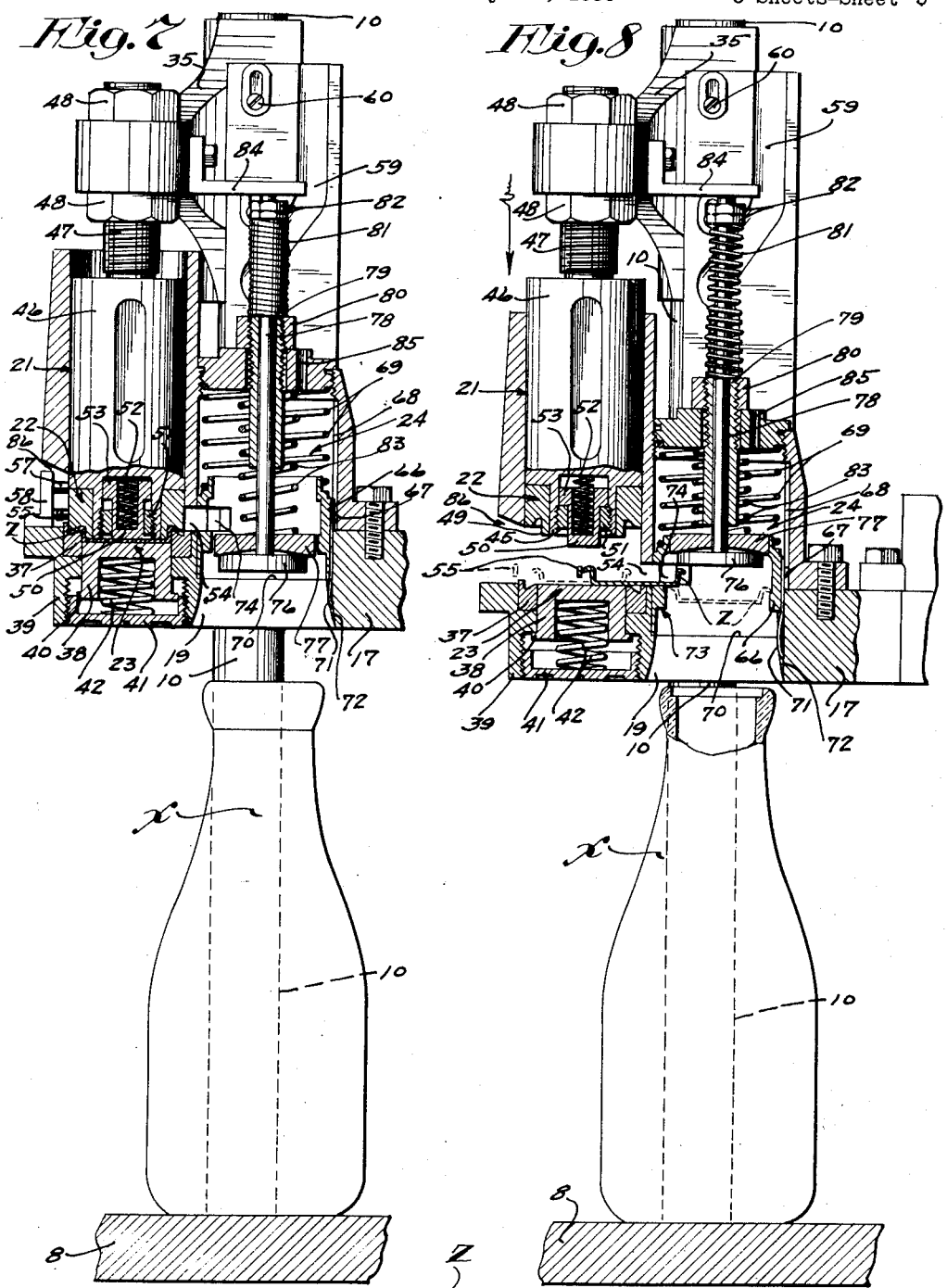
Inventor
Benjamin F. Davis
by his Attorneys Patented Oct. 17, 1933

1,931,433

UNITED STATES PATENT OFFICE 1,931,433

BOTTLE CAPPING APPARATUS

Benjamin F. Davis, Minneapolis, Minn., assignor of one-half to Walter H. Riedel, St. Paul, Minn.

Application May 28, 1930. Serial No. 456,442

45 Claims. (Cl. 226—92)

This invention relates to bottle capping machines and has for its object to provide such a machine for forming a cap, especially for milk and cream bottles, of the type having a depressed central portion and a sanitary annular marginal flange that extends outwardly over the rim of the neck of a bottle and covers the same, and applying the formed cap to the bottle.

To the above end, generally stated, the invention consists of the novel devices and combinations of devices hereinafter described and defined in the claims.

It is now the general practice, when this type of cap is used, to preform the same and therefore feed the caps into a bottle capping machine and which practice is objectionable for the reason that this type of cap is bulky so that relatively few thereof may be placed in the magazine therefor on the machine and necessitates the frequent re-filling thereof. Furthermore, these caps are hard to stack so as to freely separate while being successively fed from the magazine to capping position in the machine.

The invention may be used as an individual cap forming and bottle capping machine, or, it may be embodied in a bottle filling machine.

As illustrated in the present application, the twin bottle capping heads of a commercial bottle filling machine, are removed and my twin cap forming and bottle capping heads substituted therefor.

In the accompanying drawings, which illustrate the invention, like characters indicate like parts throughout the several views.

Referring to the drawings:

Figs. 7 and 8 are views corresponding to the left head, as shown in Fig. 1, but showing the movable parts thereof in different positions; and Fig. 9 is a perspective view of the cap.

Figure 1:
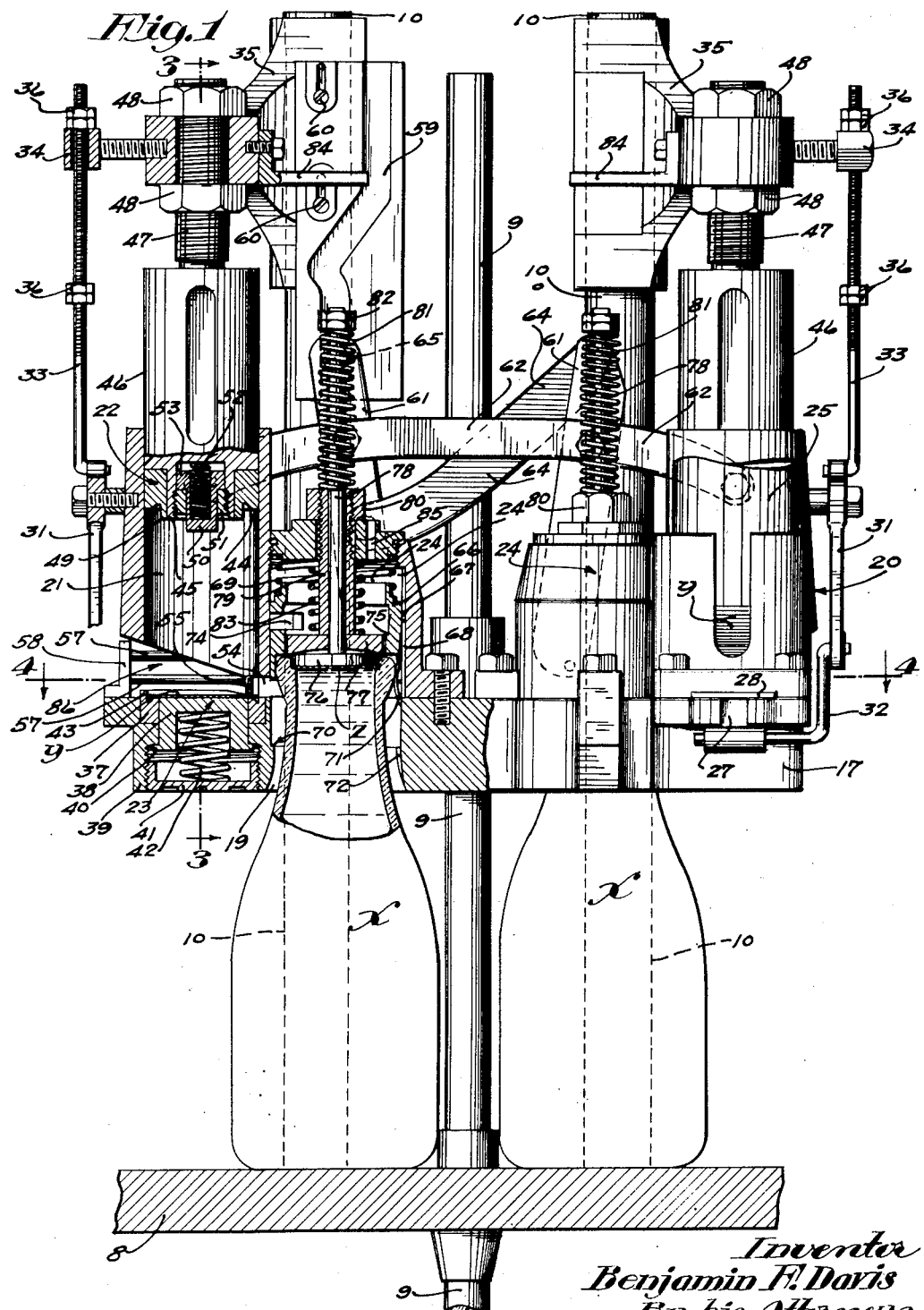
Fig. 1 is a view partly in side elevation and partly in vertical section showing the twin cap forming and bottle capping heads applied to the reciprocating vertical shaft and fixed guides of a bottle filling machine.

The present embodiment of the invention, which has twin heads or units, is in a commercial bottle filling and capping machine and of the parts thereof, fragmentarily illustrated in the drawings, the numeral 8 indicates the feed table, 9 the vertically movable shaft which carries twin capping heads, not shown, and 10 the pair of fixed upright guide posts therefor. Milk or cream bottles X are successively moved on the feed table 8 to the bottle filler and from said bottle filler past the twin capping heads.

Figure 5:
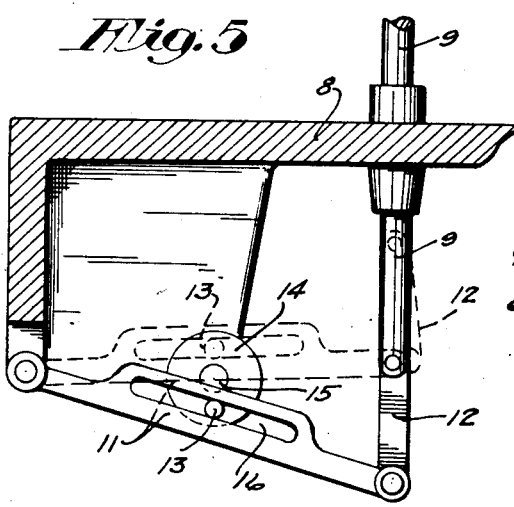
Fig. 5 is a fragmentary detail view with the feed table shown in section taken on the line 5—5 of Fig. 4 and some parts shown in different positions by means of broken lines.
Figure 6:
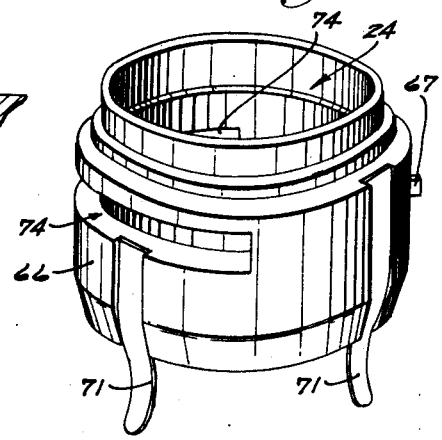
Fig. 6 is a perspective view of the left centering sleeve removed from its head.

The shaft 9, which works through a long bearing therefor in the top of the table 8, is reciprocated in timed relation to the movement of the bottles on said table by connections, only certain of which are illustrated, to wit: a lever 11, pivoted to a depending flange on the back of said table, connected by a link 12 to the lower end of the shaft 9 and fulcrumed intermediate of its ends on the pin 13 of a crank head 14 fixed on one end of a horizontal shaft 15 journaled in bearings on the under side of said table. The crank pin 13 works in a longitudinally extended slot 16 in the lever 11, see Fig. 5, and the shaft 9 is driven from a movable part of the machine, not shown. The original twin capping heads of this machine have been removed from the shaft 9 and guides 10 and my twin cap forming and bottle capping heads substituted therefor.

Referring now in detail to the invention, the twin cap forming and bottle capping heads have a common horizontal base 17 on the rear portion of which are long bearings through which the shaft 9 and guide posts 10 extend. Set screws 18 rigidly secure the base 17 to the shaft 9 for common reciprocatory movement therewith. Formed in the base 17 for each head is a vertical bottle neck passageway 19 having a flaring lower end portion. The passageways 19 are radially spaced from each other longitudinally of the base 17 and the bottles X during their travel from the bottle filler pass under the base 17 and on a line extending through the axes of said passageways.

As to the feeding of the bottles X to the twin heads from the bottle filler, it will be sufficient to simply state that they are intermittently moved on the table 8, individually spaced the same distance apart and the radial spacing of the passageways 19 corresponds thereto and that said bottles are successively positioned in pairs under the base 17 in axial alignment with said passageways.

From a broad view point as to the invention, the bottles X could just as well be placed by hand under the base 17 in axial alignment with the passageways 19 and removed by hand at the completion of the capping thereof.

Each head includes a magazine 20, a die cylinder or chamber 21, a relatively fixed upper die 22 and a relatively movable cooperating lower die 23 and a cap applying chamber 24. The magazine 20 is adapted to hold a stack of cap blanks Y and has a displaceable transparent upper section 25. A weight 26 is loosely supported on the top of the stack of blanks Y and feeds the same downward in the magazine 20 as said blanks are successively removed from the bottom of the stack.

At the bottom of the magazine 20 is a crosshead 27 mounted in a way in the base 17 and having an ejector blade 28 rigidly secured to the top thereof. This ejector blade 28 is of substantially the same thickness as one of the blanks Y and has in its front end a segmental notch 29 formed on a curve having the same diameter as the blanks Y. The upper face of the base 17 and the ejector blade 28 are in the same plane and when said blade is retracted the stack of blanks Y is supported directly on the base 17.

During the projecting movement of the ejector blade 28 the lowermost blank Y is engaged thereby, slid horizontally through a passageway 30 and into the die chamber 21. The segmental notch 29, into which the lowermost blank Y extends during the projecting movement of the ejector blade 28, holds the engaged blank for straight line movement with said blade.

Figure 2:
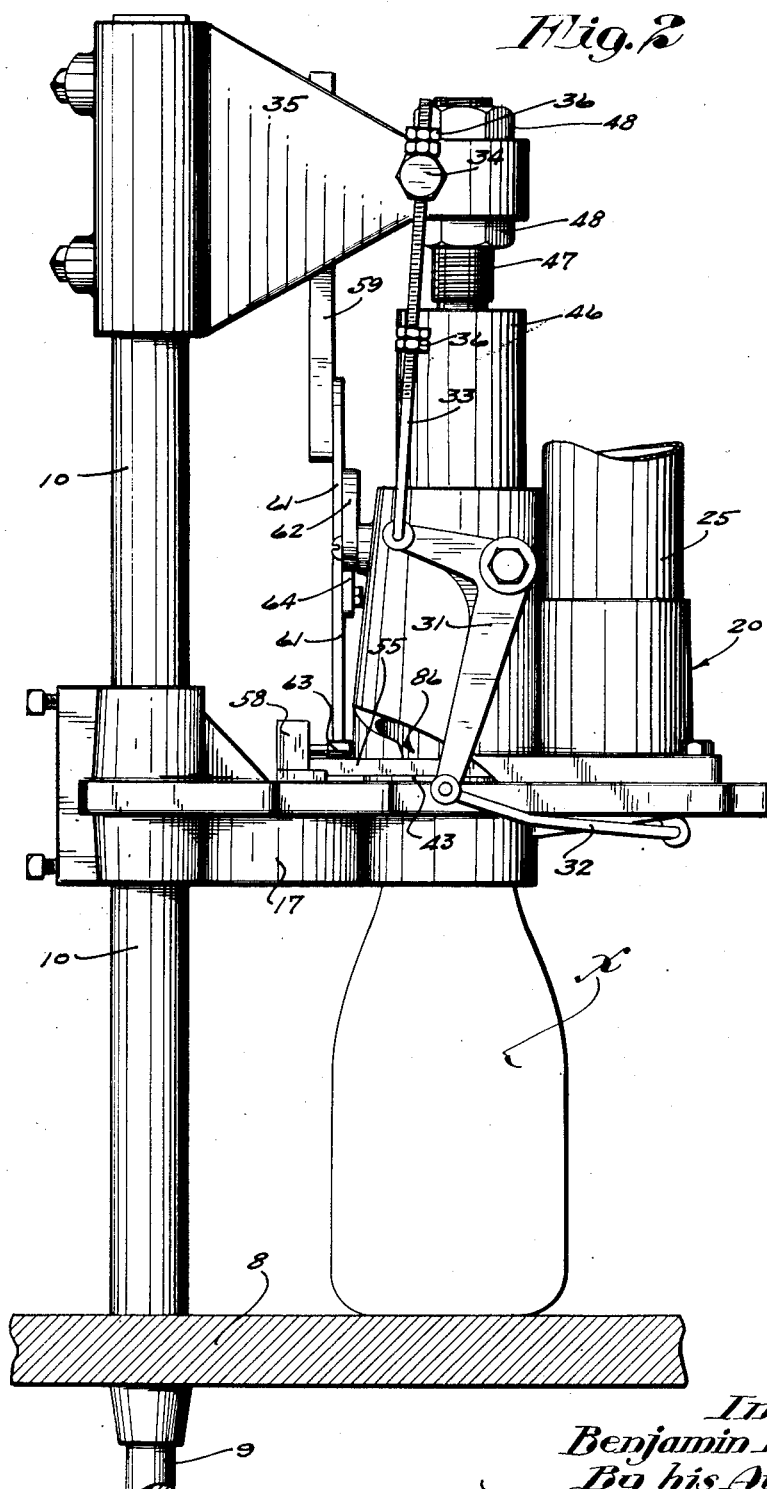
Fig. 2 is a left hand elevation of the same.

Intermittent reciprocatory movement is imparted to the ejector blade 28 by a bell-crank lever 31, pivoted to the shell of the die chamber 21, and having a depending long arm and a horizontal short arm. A link 32 connects the long arm of the lever 31 to the ejector blade 28 and a connecting rod 33, pivoted to the short arm of said lever, slidably works through a radial hole in an abutment 34, in the form of a machine screw, on a heavy bracket 35 rigidly secured to the upper end of the adjacent guide post 10 by set screws, see Fig. 2. There is sufficient lateral play between the rod 33 and the abutment 34 to permit the required movement of the lever 31. A pair of stop shoulders 36 on the rod 33 are arranged to alternately engage the abutment 34 as a base of resistance and operate the lever 31 during its movement with the reciprocating head. Each stop shoulder 36, as shown, includes a pair of nuts having screw-threaded engagement with the rod 33 and one of which affords a lock nut for the other.

During the upward movement of the head the lower stop shoulder 36, of the connection just described, engages the abutment 34 and imparts a receding movement to the ejector blade 28 and during the downward movement of said head, the upper stop shoulder 36 engages the abutment 34 and imparts a projecting movement to said blade to feed the lowermost blank Y through the passageway 30 and into the die chamber 21.

The dies 22 and 23 are designed to form a cap Z from one of the blanks Y with a depressed central portion that snugly fits in the neck of a bottle X and an outstanding annular flange that covers the rim of the bottle, as shown in Fig. 9.
The lower die 23 includes a fixed ring 37 removably mounted in a seat therefor in the top of the base 17 and a receding annular block 38 mounted in a seat therefor in the upper end of a recessed depending annular boss 39 on the bottom of said base. An annular stop flange 40 on the lower end of the block 38 is arranged to engage an internal shoulder in the boss 39 and limit the projecting movement of said block through the die ring 37. The recess in the boss 39 is normally closed by a screw plug 41 and a coiled spring 42 is compressed between said plug and the block 38 which is recessed to receive the same. Said spring 42 yieldingly and normally holds the block 38 projecting into the die ring 37 with its stop flange 40 engaging the shoulder therefor in the boss 39 and with the upper face of said block flush with the upper internal portion of said ring. The die ring 37 has an annular upstanding outer flange 43 to position a blank Y on the lower die 23 in axial alignment therewith. This flange 43 is reduced in height at the passageway 30 to permit the movement of a blank Y thereover from the magazine 20 to the die chamber 21.

The upper die 22 includes an annular ring 44 having a working fit within the wall of the die chamber 21 and is rigidly secured on the depending axial stud 45 on the lower end of a fixed piston-like vertical guide 46 over which the die cylinder 21 slides axially. On the upper end of the guide 46 is a long axially positioned screw stud 47 which extends through a bore in the outer end of the bracket 35 and is rigidly but adjustably secured thereto by a pair of opposing nuts 48 on said stud.

Formed with the die ring 44 is an inner depending annular flange which, together with the lower end of the stud 46, forms an extension 49 of the die 22. This die extension 49 is arranged to be engaged by the block 38 which depresses said block and permits the die ring 37 to telescope onto the extension 49 and form the depressed central portion of the cap Z.

A clamp 50 is provided for holding a blank Y centered on the die 23 prior to the action of the dies 22 and 23 on said blank and which clamp, as shown, is in the form of a receding pin of relatively large diameter. This clamp 50 is mounted in the stud 45, which is recessed to receive the same, and works axially through a bearing 51 therefor in the form of a screw plug that normally closes said recess. An axial borelike seat is formed in the inner end of the clamp 50 for a coiled spring 52 compressed between said clamp and the guide 46 to normally and yieldingly hold said clamp projected. On the inner end of the clamp 50 is an annular flange 53 which normally engages the screw plug 41 and limits the projecting movement of said clamp, see Fig. 1. The tension of the spring 52 is much less than that of the spring 42 so that the block 38 affords a base of resistance for the clamp 50 and causes a receding movement thereof to permit the die 22 to receive the die 23 during the action thereof in forming a cap Z.

During the receding movement of the die 23 in respect to the die 22 at the completion of the forming of a cap Z the block 38, as the same is returned to normal position by its spring 42, lifts the completed cap to withdraw its depressed central portion from the die ring 37 for movement from the die chamber 21 through a passageway 54 and into the capping chamber 24.

A horizontal reciprocating ejector finger 55 is provided for moving a completed cap Z from the die chamber 21 into the capping chamber 24. This ejector finger 55 is rigidly secured to a block 56 slidably mounted on a way in the form of a pair of vertically spaced horizontally guide rails 57 secured to short upright posts 58 on the base 17.

At this time it will be necessary to consider the ejector fingers 55 of both heads for the reason that they are both operated from the same source, to wit: a tracer cam 59 the block of which is secured by screws 60 to the left hand guide post 10 and which screws extend through vertical slots in said block. The connections from the ejector fingers 55 include a pair of upright levers 61 pivoted intermediate of their ends to a cross-tie bar 62 secured to the shells of the two die chambers 21 at the backs thereof. Pivoted links 63 connect the lower ends of the levers 61, one to each of the block 56 which carry the ejector fingers 55. A cross link 64 connects the upper arm of the right hand lever 61 to the lower arm of the left hand lever 61 and a cam roller 65 journaled on the upper end of the left hand lever 61 is mounted in the channel of the tracer cam 59 to operate said connections during the reciprocatory movement of the two heads and imparts like movements to the two ejector fingers 55.

The bottle capping mechanism includes a centering sleeve 66 mounted in the capping chamber 24 for vertical sliding movement and is held against relative rotation by a radial pin 67 which extends into a vertical slot 68 in the wall of said chamber. A coiled spring 69 is compressed between the upper end of the sleeve 66 and top of the chamber 24 and normally and yieldingly holds said sleeve in its lowermost position in which it rests on an internal annular shoulder 70 formed in the wall of the chamber 24 just above the flaring lower end thereof.

The open lower end of the centering sleeve 66 has an internal diameter slightly greater than that of the external diameter of the top of the neck of a bottle X so as to freely receive the same. Said centering sleeve 66 is also provided with three depending circumferentially spaced leaf springs 71 having outwardly and downwardly curved lower end portions which extend below said sleeve for engagement with the exterior of the top of a bottle X and center the same in the sleeve 66. Grooves 72 are formed in the shoulder 70 in which the springs 71 move when the centering sleeve 66 is in its lowermost position.

An annular internal shoulder 73 in the lower end portion of the centering sleeve 66 is arranged to engage the rim of a bottle X and limit the movement of its neck into said sleeve and cause said bottle to lift the centering sleeve 66 therewith during the application of a cap Z to the same.

A circumferentially extended radial entrance passageway 74 in the centering sleeve 66 is in registration with the passageway 54 when said sleeve is in its lowermost position and resting on the stop shoulder 70, for the movement of a cap Z by the ejector finger 55 therethrough from the die chamber 21 to the centering sleeve 66. Formed in the centering sleeve 66 just below the entrance passageway 74 is a narrow internal annular ledge 75 on which the peripheral edge portion of the flange of a cap Z rests to support the same for application to a bottle X.

A main plunger 76 and an auxiliary plunger 77 are provided for applying a cap Z to a bottle X and are in the form of concentric discs arranged the latter above the former. The plunger 76 is adapted to enter the depressed central portion of a cap Z supported on the ledge 75 and press the same into the seat therefor in the neck of a bottle X and the auxiliary plunger 77, which is of a larger diameter than the plunger 76, is adapted to engage the flange of the cap Z and press the same onto the rim of said bottle.

The main plunger 76 is rigidly secured at its axis to the lower end of an upright stem 78 mounted for endwise sliding movement in a long sleeve bearing 79 which, in turn, is mounted with freedom for endwise sliding movement in a seat therefor in the top of the capping chamber 24 at the axis thereof.

A nut 80 having screw-threaded engagement with the upper end portion of the bearing 79 normally rests on the top of the capping chamber 24 and holds said bearing suspended in said chamber. The auxiliary plunger 77 has an axial hole through which the stem 78 loosely extends and said plunger normally rests on the top of the main plunger 76. As shown, the under face of the auxiliary plunger 77 is concave so that it has only direct contact with the main plunger 76 at the periphery thereof. This auxiliary plunger 77 has a working fit with the upper portion of the wall of the sleeve 66, centered and vertically slidable in the capping chamber 24 and thereby holds the two plungers 76 and 77 centered in said chamber.

A coiled spring 81 encircling the stem 78 is compressed between the upper end of the bearing 79 and a stop shoulder 82 on the upper end of said stem and, as shown, is in the form of a pair of nuts. This coiled spring 81 yieldingly holds the auxiliary plunger 77 lifted against the lower end of the bearing 79 and the main plunger 76 lifted against said auxiliary plunger. A coiled spring 83 encircling the bearing 79 is compressed between the top of the capping chamber 24 and the auxiliary plunger 77 and its tension is less than that of the spring 81 and is normally overcome thereby.

An angle stop 84 secured to the left hand bracket 35 is arranged to be engaged by the upper end of the stem 78 during the lifting movement of the head and holds the plungers 76 and 77 stationary and cause a relative movement of the chamber 24 during further upward movement of the head to eject a cap Z in said chamber and prevent clogging thereof in case a bottle X was not positioned to operate the centering sleeve 66 and be capped during the previous cycle of operation of the machine. In the top of the capping chamber 24 is a breather hole 85. A large sight opening 86 is formed in the wall of the die chamber 21 at the base 17 through which dust and lint accumulated on the lower die 23 may be removed.

Each cycle of operation of the machine, which includes an up-stroke and a down-stroke of the heads imparted thereto by the reciprocating shaft 9, is as follows, starting with the upper stroke after the machine has been operated sufficiently to cap the first two bottles X and position blanks Y on the lower dies 23, to wit: during the initial upward movement of the heads the centering sleeves 66 are yieldingly held pressed downward on the bottles X and the plungers 76—77 are yieldingly held by their springs on the applied caps Z. Further upward movement of the heads brings their shoulders 70 into contact with the centering sleeves 66, carries the same therewith and thereby lifts said sleeves from the bottles X and the plungers 76—77 from the applied caps Z. Continued upward movement of the heads brings the upper ends of the stems 78 into contact with the stops 84 which hold the plungers 76—77 stationary and cause a relative movement of the centering sleeves 66 to eject a cap or caps Z in said sleeves in case no bottles X were positioned to produce capping action in the machine during the previous cycle thereof, see Fig. 7.

During this upward movement of the heads the travel of the cam roller 65 in the tracer cam 59 has operated the ejector fingers 55 and positioned the same on diametrically opposite sides of the lower dies 23 from the passageways 54. While the heads have been moving upward, the rods 33 have loosely moved endwise through the abutments 34 until stopped, just before said heads have reached the limit of their upward movement by the engagement of their lower stop shoulders 36 with said abutments. This stopping of the rods 33 actuates the bell-crank levers 31 which retracts the ejector blades 28 and moves the same from under the stacks of blanks Y and allows said stacks to drop onto the base 17 and position the lowermost blanks Y in front of said blanks.

Just before the heads reach the limit of their upward travel, the blanks Y on the lower dies 23 are brought into contact with the clamps 50 which securely hold the same centered on the blocks 38 and which clamps recede under the approaching movement of said dies. Further movement of the lower dies 23 toward the upper dies 22 brings the blanks Y into contact with the depending central extensions 49 on said upper dies, telescopes the rings 37 of the lower dies 23 onto said extensions which form the depressed central portion of the caps Z and at which time the blocks 38 recede in advance of this formation and finally the cooperating die rings 37 and 44 form the flanges on said caps.

The above operations complete the first half of the cycle of operation of the machine.

Substantially at the completion of the first half of cycle of operation of the machine and before beginning of the second half thereof the capped bottles X are moved from under the raised heads and the two next following filled bottles are positioned thereunder in axial alignment with the passageways 19 to be capped during the last half of said cycle.

The initial return or downward movement of the heads carries the lower dies 23 away from the upper dies 22 leaving the formed caps Z on said lower dies and the springs 42 which have been placed under tension by the receding movements of the blocks 38, during the formation of the caps Z, return said blocks to normal positions and lift the depressed central portions of said caps from the die rings 37 and position said caps in horizontal alignment with the passageway 54.

During this initial movement of the lower dies 23 from the upper dies 22 the movement of the cam roller 65 in the tracer cam 59 actuates the ejector fingers 55 which slide the caps Z from the lower dies 23 through the aligned passageways 54—74, into the capping chamber 24 and deposit the same on the ledges 75, see Fig. 8. During this initial return movement of the heads the compressed springs 81 have gradually been released and the centering sleeve 66 returned to substantially normal relation to the plungers 76—77.

At the completion of the positioning of the caps Z on the ledges 75 the tracer cam 59 retracts the ejector fingers 55 and positions the same in the cap forming chamber 21, see Fig. 1. Further downward movement of the heads causes the tops of the bottles X to project into the passageways 19 and at this time the springs 71 center said bottles in respect to the caps Z on the ledges 75.

Continued downward movement of the heads brings the shoulders 73 on the centering sleeves 66 into engagement with the rims of the bottles X at the outer edge portions thereof, supports said sleeves thereon and prevents further downward movement of the centering sleeves 66 with the heads and places their springs 69 under tension.

During the movement of the centering sleeves 66 into contact with the bottles X the main plungers 76 enter the depressed central portions of the caps Z, force the same from the ledges 70 into the necks of the bottles X and onto the seats therefor and the auxiliary plungers 77 press the flanges of the caps Z on the rims of said bottles.

To compensate for slight differences in the height between the cap seats in the bottles X and the rims thereof and for varying thicknesses of the stock from which said caps are made, the plungers 76 upon being stopped by the seating of the caps in the bottles, will remain stationary while the heads move in respect thereto. This movement of the heads 17 compresses the springs 83 and the tops of the capping chambers 24 move downward on the bearings 79. The auxiliary plungers 77 are also free for independent movement in respect to the main plungers 76 for similar compensation and at this time the springs 81 and 83 are compressed and the bearings 79 moved endwise through openings therefor in the tops of the capping chamber 24. The spring 69 will compensate for bottles that vary in height.

Figure 3:
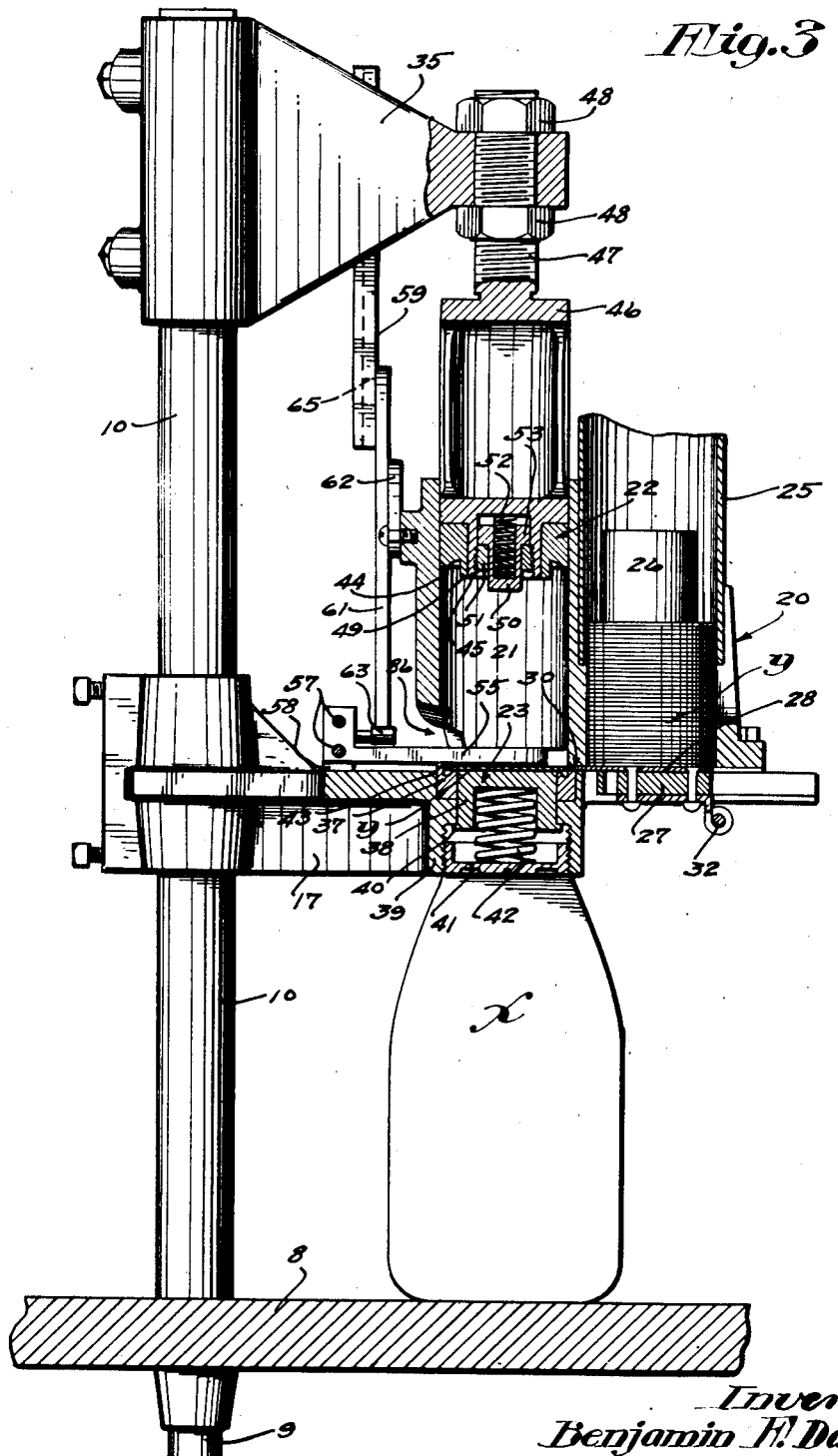
Fig. 3 is a view partly in side elevation and partly in vertical section taken on the line 3—3 of Fig. 1.
Figure 4:
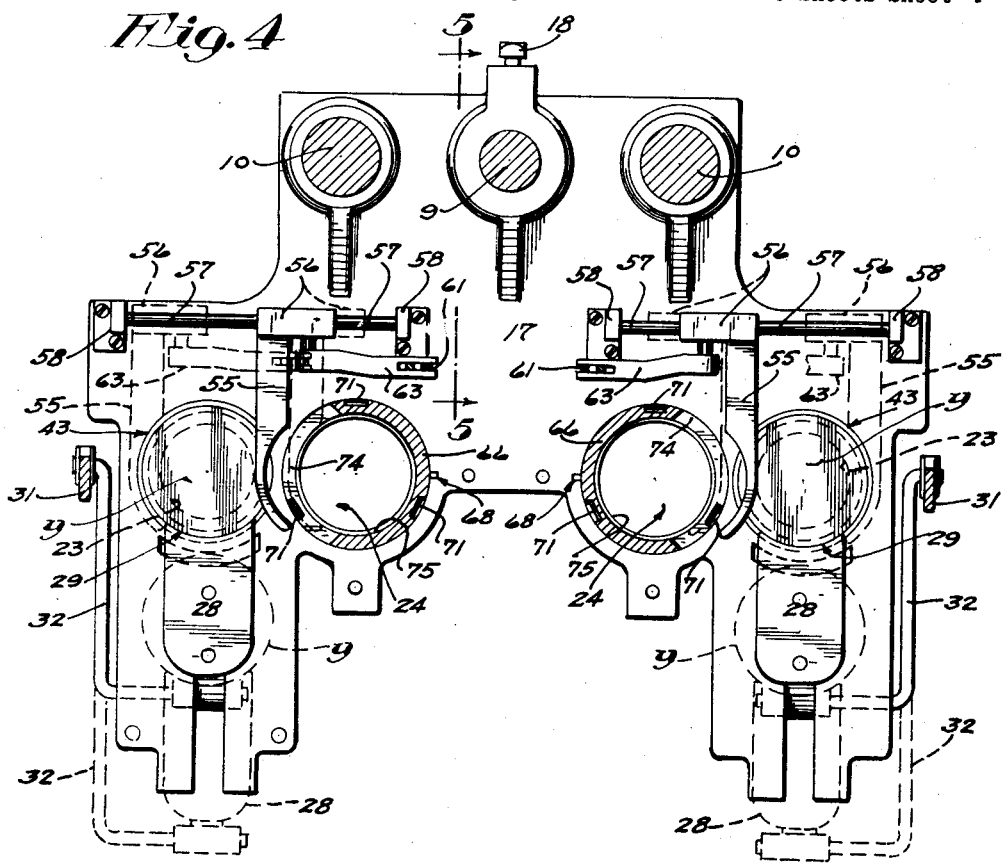
Fig. 4 is a view partly in plan and partly in horizontal section taken on the line 4—4 of Fig. 1.

Also during capping action the upper stop shoulders 36 have engaged the abutments 34, actuated the levers 31 which project the ejector slides 28 and move the lowermost blanks Y in the stacks through the passageways 54—74 into the cap forming chambers 21 and onto the lower dies 23, see Fig. 3, which completes the second half of the cycle of operation.

What I claim is:

1. In a machine of the class described, in combination, a base having a vertical bottle head receiving passage, said base reciprocatory down and back on each operation cycle; a flat blank magazine; dies for forming a cap with a depressed central portion and an outstanding flange, means for feeding cap blanks from said magazine to the dies on each operation cycle, a cap applying device alined with said passage, and means for feeding caps from the dies to the cap applying device one on each operation cycle, said device adapted to seat a cap in a bottle mouth on each operation cycle.

2. In a machine of the class described, a bottle support, a head having a cap applying chamber and a bottle neck passageway leading thereto, means for reciprocating the head toward and from the bottle support, a spring-projected centering sleeve in said chamber formed to hold a cap below a cap applying device and arranged to engage the top of a bottle on the support during the reciprocatory movement of the head toward the support and be held thereby to cause a relative movement of the head, and a cap applying device in the capping chamber.

3. The structure defined in claim 2 in which the cap applying device is yieldingly held normally projected toward the bottle support, and means are provided whereby said device is adapted to force a cap into a bottle mouth on each operative cycle of said head.

4. The structure defined in claim 2 in which the centering sleeve is provided with a plurality of circumferentially spaced bottle centering springs.

5. The structure defined in claim 2 in which the cap applying device is adapted to enter the depressed central portion of a cap and press the same onto an internal seat therefor in a bottle and press the outstanding flange of the cap onto the rim of the bottle, means being provided whereby on each operative cycle of said head a cap is formed having a depressed central portion, and whereby said cap is brought into operative position with respect to said applying device.

6. The structure defined in claim 2 in which the capping device includes relatively movable yieldingly held main and auxiliary cap applying plungers.

7. The structure defined in claim 2 in which the capping device includes a main plunger and an auxiliary plunger the former having a stem on which the latter is mounted for axial movement, a bearing for the stem, said bearing and stem having relatively axial movement, a stop relatively fixed in respect to the head for limiting the movement of the bearing toward the plungers, a spring operative on the stem and normally holding the main plunger against the auxiliary plunger and the auxiliary plunger against the bearing, and a second spring normally holding the bearing against said stop.

8. The structure defined in claim 2 in which the capping device includes a main plunger and an auxiliary plunger the former having a stem and on which the latter is mounted for axial movement, a bearing in which the stem is mounted for axial movement, said bearing being mounted in the capping chamber for axial movement that is limited toward the plungers, a spring held under tension by the stem and bearing and normally holding the main plunger against the auxiliary plunger and the auxiliary plunger against the bearing, and a second spring normally holding the bearing at the limit of its axial movement toward the plungers, the tension of the first noted spring being sufficient to overcome the tension of the last noted spring.

9. The structure defined in claim 2 in which the bottle capping device is yieldingly held in an operative position and in which the centering sleeve has a cap support, and which structure further includes a stop for limiting the movement of the bottle capping device with the head to cause a relative movement of the centering sleeve during its movement from the bottle support to eject a cap on the support in the centering sleeve.

10. In a machine of the class described, a head having a cap forming device, including a cylinder on the head, means for reciprocating the head, a member on which said cylinder is relatively movable during head reciprocation, and cooperating upper and lower dies in the cylinder, one of which is on the head and the other on said member, the upper die having means to strip the completed cap therefrom, the lower die having means to elevate the formed cap therefrom for lateral discharge to bottle capping mechanism.

11. In a machine of the class described, a head having a cap forming device, including a cylinder on the head, means for reciprocating the head, a fixed support on which said cylinder slides during the reciprocatory movement of the head, and cooperating upper and lower dies in the cylinder, one of which is on the head and the other on said support in which the support is axially adjustable.

12. In a machine of the class described, a reciprocatory head, a cap blank magazine on the head, a cap forming device including a cylinder on the head, means for reciprocating the head, cooperating upper and lower dies in the cylinder one of which is on the head and the other supported independently thereof, an ejector for successively moving cap blanks from the magazine into said cylinder and onto the lower die, and connections carried by the head for operating the ejector, and means for actuating the connections.

13. In a machine of the class described, a head, means for reciprocating the head, a cap forming device including a lower die on the head and a relatively fixed cooperating upper die, said lower die including a ring and a yieldingly held block normally projecting into said ring, said upper die including a ring having an axial extension arranged to telescopically receive the ring of the lower die and depress said block, and a yieldingly held clamp carried by the upper die for holding a cap blank on the block and be moved thereby into a retracted position during the movement of the lower die onto the upper die, means for inserting each cap into a bottle mouth, means for successively delivering caps from said forming device to said last mentioned means, and means whereby on each cycle operation of said head, a cap is formed, a cap is delivered to said inserting means, and said inserting means is adapted to insert a cap into the bottle mouth.

14. In a machine of the class described, a head, a cap blank magazine on the head, a cap forming device including a cylinder on the head, means for returning the head, a fixed support on which said cylinder slides during the reciprocatory movement of the head, cooperating upper and lower dies in the cylinder one of which is on the head and the other on said support, an ejector for successively moving cap blanks from the magazine into said cylinder and onto the lower die, connections for operating the ejector including a bell-crank lever on the head, a link connecting one of the arms of said lever to the ejector and a rod attached to the other arm of said lever and a relatively fixed abutment having an aperture through which the rod is free to move endwise said rod having a pair of axially spaced stop shoulders arranged to alternately engage the abutment during the reciprocation of the head to operate said connections.

15. In a machine of the class described a head, means for reciprocating the head, said head having a cap forming chamber and a cap applying chamber, an ejector finger mounted on the head for moving caps from the cap forming chamber to the cap applying chamber, connections on the head for operating the ejector finger and a cam supported independently of said head for operating the connections.

16. In a machine of the class described, a head, means for reciprocating the head, said head having a cap forming chamber and a cap applying chamber, an ejector finger mounted on the head for moving caps from the cap forming chamber to the cap applying chamber, connections on the head for operating the ejector finger including a lever, and a cam supported independently of the head for operating the lever.

17. Bottle capping apparatus, including a magazine for a stack of flat paper cap blanks; cooperating dies for forcibly shaping said blanks into annularly flanged depressed-center paper plug caps; a cap applying plunger for seating a plug cap from said dies down in a bottle mouth with its flange lying over the top edge of said mouth; means for supporting a plug cap from said dies in operative relation to said plunger for bottle capping; a feed for delivering blanks from said magazine to said dies; and an ejector for removing a just formed plug cap from said dies and positioning the same in said means.

18. Apparatus for producing annularly-flanged depressed-center flexible paper plug caps from flat blanks and thereupon capping bottles therewith; embodying a holder for a supply of flat paper blanks for production into said plug caps; cooperating dies for forcibly shaping each blank into an annularly-flanged depressed-center paper plug cap of reduced maximum exterior diameter with respect to the maximum exterior diameter of the blank; a forcing plunger for seating a plug cap in a bottle mouth with its flange extending over the top edge of said mouth; means being provided to center a bottle mouth in approximate longitudinal alignment with said plunger, and to support by its flange a flanged plug cap received from said dies for seating by said plunger in and on a bottle mouth; a feed for delivering each plug cap from said dies to and positioning the same supported by its flange in said means; and a feed for delivering a flat blank from said holder to said dies and centering the same with respect thereto for forceful shaping thereby.

19. Bottle capping apparatus, including cap applying means; die mechanism for producing an annularly-flanged centrally-depressed paper plug cap from a flat disk blank; mechanisms for supplying such flat blank to said die mechanism and for delivering the formed plug cap from said die mechanism into operative relation to said cap applying means; a movable head being provided having operating means for driving said head on its operative cycles each including a bottle capping stroke and a return stroke; and associated means and actuating mechanisms whereby on each operating cycle of said head toward and from a bottle in capping position said apparatus is adapted to apply a plug cap to said bottle produced by said die mechanism during the preceding operative cycle, deliver a formed plug cap from the die mechanism to said cap applying means, deliver a blank to said die mechanism, and produce a plug cap by said die mechanism from a blank.

20. Bottle capping apparatus having means for producing an annularly-flanged depressed-center paper plug cap from a flat disk blank on each operative cycle to be applied to a bottle on the next operative cycle; said apparatus including a movable head having operating means to actuate said head on its operative cycles each including a bottle capping stroke and a return stroke, said head providing a bottle centering means and a capping plunger operatively arranged with respect thereto; a die chamber carried by said head; die mechanism operating in said chamber to press an annularly flanged depressed center paper plug cap from a flat disk blank; a feed magazine carried by said head for flat disk blanks; means for successively forcing blanks from said magazine into said die mechanism in said die chamber; means for removing formed plug caps from said die chamber and die mechanism and positioning the same in operative relation to said plunger for bottle capping; means supported independently of said head and with respect to which said head is relatively movable; and actuating mechanisms brought into operation by said relative movement to bring about discharge of a formed plug cap by said plunger, delivery of a formed plug cap from said die mechanism to said plunger, delivery of a blank to said die mechanism and the formation of a shaped plug cap by said die mechanism, during an operative cycle of said head.

21. In bottle capping apparatus having means for shaping flat disk paper blanks into annularly-flanged centrally-depressed plug bottle caps; in combination, a capping head having a bottle head receiving chamber and a capping plunger operative therein; die mechanism adjacent to said chamber for shaping said flat blanks into said annularly flanged plug caps; and means for removing said plug caps from said die mechanism and delivering them into operative relation for capping by said plunger.

22. In bottle capping apparatus; in combination; a capping head having a cap applying chamber; a spring projected bottle centering sleeve longitudinally movable in said chamber and with respect to said head; a spring projected longitudinally yieldable bottle capping plunger carried by said head and arranged within said sleeve, said sleeve and plunger being relatively movable longitudinally, said sleeve adapted to radially receive a shaped annularly flanged bottle cap and to support said cap by its flange in operative bottle capping relation to said plunger; and means to deliver a shaped flanged bottle cap radially into said sleeve with its flange in self-supporting engagement with the interior of said sleeve.

23. Bottle capping apparatus, including a capping head having a cap applying chamber and a cap applying plunger therein; an adjacent die chamber; said head providing a bottle cap passage extending laterally from the interior of said die chamber and opening laterally into the interior of said cap applying chamber below the normal level of said plunger; a periodically movable positive ejector for discharging shaped bottle caps from said die chamber along said passage into said applying chamber to operative bottle capping relation to said plunger; and die mechanism for shaping flat sheet blanks in said die chamber into flexible centrally-depressed plug caps having elevated out-turned annular flanges.

24. Bottle capping apparatus, including a head movable on capping and return strokes; means supported independently of said head; said head provided with a flat disk blank holder, means for centering a bottle to be capped, means for applying a shaped cap to said bottle, a cap shaping die, means to deliver a blank from said holder to said die, and means to deliver a shaped cap from said die to said cap applying means; a movable die for cooperating with said first mentioned die to shape a flat blank into a shaped bottle cap; and connections establishing operative relations between said independently supported means and said movable die, and said means for delivering a blank, and said means for delivering a shaped cap, whereby said movable die and said means for delivering a blank and a shaped cap are actuated on said capping and return strokes through relative movement between said head and said independently supported means.

25. Bottle capping apparatus, including a head having a bottle receiving passage and a stop, a longitudinally slidable bottle engaging sleeve in said passage; a spring normally yieldingly holding said sleeve projected and against said stop; a longitudinally-yielding spring pressed cap applying plunger normally arranged within said sleeve; said sleeve having a radial shaped bottle cap inlet opening; and periodically movable means to discharge a shaped bottle cap through said opening into said sleeve below said plunger.

26. Bottle capping apparatus, including upper and lower cooperating dies for pressing and contracting a flat paper disk blank into an annularly flanged centrally depressed paper plug bottle cap of smaller maximum exterior diameter than that of the blank, relatively-fixed blank centering means for the lower die; means for separating said dies and forcefully bring them together to press and contract the blank into the shaped cap; a head provided with a bottle head receiving passage and cap applying means adjacent to said lower die; means for discharging the shaped cap laterally from said lower die into operative bottle capping relation to said cap applying means; and means for depositing a flat disk blank on said lower die and cooperating with said centering means to center said blank with respect to said die.

27. Bottle capping apparatus, including a head movable on its bottle capping and return strokes; independently supported means provided with a stop; said head provided with a bottle head passage to longitudinally receive the head of a bottle at bottle capping position on the capping stroke of the head and to withdraw from the head of the capped bottle on the return stroke of the head; a spring projected longitudinally yieldable bottle capping plunger in said passage, means being provided to support a shaped flexible bottle cap in said passage below and in operative capping relation to said plunger, said plunger provided with means to engage said stop during the completion of the return stroke of said head to stop the return movement of the plunger with the head and thereby cause the plunger to discharge from said passage a shaped cap retained therein and not applied to a bottle head on the previous capping stroke of said head.

28. Bottle capping apparatus, including means for centering a bottle in capping position; shaped cap applying mechanism associated with said means; mechanism for forcibly pressing and shaping a flat disk paper blank into a bottle cap; feed means for delivering a flat disk paper blank to said cap shaping mechanism; discharge means for delivering a shaped cap from said cap shaping mechanism to said cap applying mechanism; a head movable on bottle capping and return strokes constituting an operative cycle toward and from a bottle in capping position; and associated means and operating mechanisms whereby on each operative cycle of said head, with a bottle in capping position, a shaped cap is applied to said bottle, and said feed and discharge means and said applying mechanism are operated and said cap pressing mechanism is actuated to shape a cap from a flat blank.

29. Bottle capping apparatus, including means for centering a bottle in capping position; shaped cap applying mechanism associated with said means; mechanism for forcibly pressing and shaping a flat disk paper blank into a bottle cap; feed means for delivering a flat disk paper blank to said cap shaping mechanism; discharge means for delivering a shaped cap from said cap shaping mechanism to said cap applying mechanism; a head movable on bottle capping and return strokes constituting an operative cycle toward and from a bottle in capping position; and associated means and operating mechanisms whereby on each operative cycle of said head, with a bottle in capping position, a shaped cap is applied to said bottle, and said feed and discharge means and said applying mechanism are operated and during the return stroke of said cycle said cap shaping mechanism completes the formation of a shaped cap from a flat blank for application to a bottle on the following operative cycle of said head.

30. Bottle capping apparatus, including a capping head to receive a bottle located in capping position; cap applying means for pressing an annularly flange paper plug cap into the seat in the mouth and onto the top edge of a bottle located in capping position; means to detachably support an annularly flanged paper plug cap by its flange in operative relation to said cap applying means for bottle capping; and die mechanism associated with said head and with said cap supporting and cap applying means for producing said shaped plug cap from a flat paper blank for delivery to said cap supporting means.

31. Bottle capping apparatus, including a capping head; mechanism for moving said head; a die mechanism associated therewith and operated by the movement of the mechanism for moving said head to press, contract and shape an annularly-flanged paper plug cap from a flat paper blank; said head adapted to receive a bottle located in bottle capping position; and means on said head for receiving said flanged contracted paper plug cap from said die mechanism and pressing it to its seat in the mouth and on the top edge of said bottle in capping position.

32. Bottle capping apparatus, including a capping head to receive and center a bottle located in capping position and provided with cap applying means for pressing a shaped flexible paper cap to said bottle to cap the same; mechanism for driving said head on its operative and return strokes toward and from bottle capping position; die mechanism for shaping said caps from flat sheet material; means for supplying said sheet material to said die mechanism; and means for delivering said shaped caps from said die mechanism to said cap applying means; said die mechanism, said means for supplying sheet material and said means for delivering shaped caps being actuated by said mechanism for driving said head and the movements thereof.

33. A machine for seating paper plugs down in the mouths of bottles, said plugs having annular upstanding portions with out-turned top flanges to rest on the surrounding top rims of the bottle mouths, said machine embodying a holder for flat paper blanks; dies for forming such blanks into said plugs; and means for driving and seating said plugs in bottle mouths, a passage being provided from said holder to said dies and from said dies to said means; mechanism for delivering blanks one by one from said holder through said passage to said dies and formed plugs from said dies through said passage to said means; said dies including a fixed ring die level with said passage and a depressible die block within said ring die and normally yieldingly upheld with its top face level with said passage, and a relatively-reciprocatory complementary upper male die, providing stripping means, and opposing said die block; and operating mechanism.

34. A machine for capping bottles, embodying a holder for flat cap blanks; complementary dies for forming said blanks into dished bottle caps; means for applying said caps to bottle mouths, mechanism for delivering blanks laterally from said holder and onto the lower of said dies and formed caps laterally from said lower die to said cap applying means; said dies including a fixed lower ring die, a die block fitted within said ring die and normally yieldingly upheld with its top face approximately level with the top face of said ring die, and a complementary upper male die opposing said ring die and die block and providing stripping means; and operating mechanisms.

35. In capping machinery, in combination; a magazine for flat paper cap blanks; upper and lower relatively-movable complementary dies for contracting and shaping a flat paper blank into a plug cap having an upstanding annular wall with a top annular out-turned flange; cap applying mechanism including a device for driving said plug into a bottle mouth, and associated annular means to press said flange of the plug in the bottle mouth down on the top lip of said bottle mouth; and devices having operative and return strokes to deliver a shaped plug from the lower die into operative relation to said cap applying mechanism, and a blank from the magazine onto the lower die.

36. In capping machinery, in combination; die mechanism for contracting and shaping a flexible flat sheet blank into a plug cap having a top outstanding annular flange; means to deliver flexible sheet blanks one by one into said die mechanism; means providing a bottle head receiving and centering mouth; a cap applying device associated with said mouth to drive a plug cap down into a bottle mouth, said device having means to force the plug flange down on the bottle top lip; means to deliver the flanged plug cap from the die mechanism into operative relation to said cap applying device; and actuating mechanisms.

37. In combination, in a bottle capping mechanism; a capping head movable on its capping and return strokes; die mechanism for contracting and shaping a flexible flat sheet blank into a plug cap having a top outstanding annular flange; means to deliver flexible sheet blanks one by one into said die mechanism; means providing a bottle head receiving and centering mouth; a cap applying device associated with said device having means to force the plug flange down on the bottle top lip; means to deliver the flanged plug cap from the die mechanism into operative relation to said cap applying device; and actuating mechanisms.

38. In combination, in a bottle capping machine; means providing a centering mouth to receive a bottle head to be capped; upper and lower relatively movable complementary dies to contract and shape a flat sheet blank into a flexible depressed center plug cap having an annular top flange, means being provided to strip the cap from said dies; a device to deliver a flat sheet blank onto the lower die; a device movable across the lower die to move the formed plug cap from said lower die into bottle capping position with respect to said mouth; a cap applying device for driving said plug into the bottle mouth, provided with means for seating the cap flange on the top lip of the bottle; and actuating mechanisms.

39. In a machine of the class described, a head having a cap-applying cylinder, a reciprocatory bottle-engaging sleeve in the cylinder, yielding means normally holding the sleeve projected, and a cap-applying plunger in the sleeve.

40. In a machine of the class described, a head having a vertical cap-applying cylinder, a reciprocatory bottle-engaging sleeve in the cylinder, a spring normally holding the sleeve projected, a cap-applying plunger in the sleeve, and a spring normally holding the plunger projected.

41. In a machine of the class described, a head having a vertical cap-applying cylinder, a reciprocatory bottle-engaging sleeve in the cylinder having on its upper end a spring seat, said head being provided with a spring abutment, a coiled spring on the seat compressed between the same and said abutment, a cap-applying plunger in the sleeve having a stem and a coiled plunger-projecting spring on said stem.

42. Bottle capping apparatus, including a capping head provided with means for applying a cap to a bottle located in capping position, on each operative cycle of the head; mechanism for operating the head on its operative cycles each consisting of a capping stroke and return stroke; die mechanism for shaping a bottle cap from sheet material for delivery to said cap applying means; and mechanisms for actuating said die mechanism to produce and complete a shaped cap on return stroke of said head and to release such shaped cap for delivery to said applying means on the next capping stroke of such head.

43. In a bottle capping machine, a head having a cap-applying chamber; a reciprocatory bottle engaging sleeve in said chamber provided at its bottle receiving end with a bottle positioning seat; means normally and yieldingly maintaining said sleeve projected; a cap-applying plunger operative in said sleeve; and means normally and yieldingly projecting said plunger.

44. In a bottle capping machine, a head having a cap-applying chamber; a reciprocatory bottle engaging sleeve operative in said chamber and provided with a radial cap passage; means for feeding caps through said passage and into said sleeve; yielding means normally holding said sleeve projected; a cap-applying plunger operative in said sleeve, and yielding means normally projecting said plunger.

45. In bottle capping machinery, a head providing a cap-applying chamber; a longitudinally movable bottle engaging sleeve in said chamber having a spring seat; a coiled spring compressed between said seat and a relatively fixed portion of said head; a cap-applying plunger operative in the sleeve providing a stem having a stop normally limiting the projection of said plunger; and a plunger-projecting yielding spring.

BENJAMIN F. DAVIS.